United States Patent
Chae et al.

(10) Patent No.: US 10,021,699 B2
(45) Date of Patent: Jul. 10, 2018

(54) METHOD AND APPARATUS FOR TRANSMITTING SIGNAL FROM DEVICE-TO-DEVICE TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Seungmin Lee, Seoul (KR); Hakseong Kim, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/026,877

(22) PCT Filed: Oct. 2, 2014

(86) PCT No.: PCT/KR2014/009318
§ 371 (c)(1),
(2) Date: Apr. 1, 2016

(87) PCT Pub. No.: WO2015/050394
PCT Pub. Date: Apr. 9, 2015

(65) Prior Publication Data
US 2016/0295595 A1    Oct. 6, 2016

Related U.S. Application Data

(60) Provisional application No. 61/885,536, filed on Oct. 2, 2013, provisional application No. 61/887,434, filed (Continued)

(51) Int. Cl.
*H04W 4/00* (2018.01)
*H04W 72/04* (2009.01)
(Continued)

(52) U.S. Cl.
CPC ....... *H04W 72/0493* (2013.01); *H04L 1/1614* (2013.01); *H04W 4/80* (2018.02);
(Continued)

(58) Field of Classification Search
CPC ...................................................... H04W 4/008
(Continued)

(56) References Cited

U.S. PATENT DOCUMENTS 7,366,471 B1 *  4/2008  Kitchin ................ H04W 16/14
                                                          455/41.2
9,055,389 B2 *  6/2015  Miklos ................. H04W 8/005
(Continued)

FOREIGN PATENT DOCUMENTS

JP         2013192146     9/2013
KR       1020130035964    4/2013
(Continued)

OTHER PUBLICATIONS

PCT International Application No. PCT/KR2014/009318, Written Opinion of the International Searching Authority dated Jan. 8, 2015, 18 pages.
(Continued)

Primary Examiner — Wen Huang
(74) Attorney, Agent, or Firm — Lee Hong Degerman Kang & Waimey

(57) ABSTRACT

An embodiment of the present invention provides a method for a terminal for transmitting a device-to-device (D2D) signal in a wireless communication system, the method for transmitting a D2D signal comprising the steps of: determining whether a D2D signal is to be transmitted on the basis of a transmission probability in a set resource region; and, if the D2D signal has been decided to be transmitted, transmitting the D2D signal from the set resource region, wherein the transmission probability is determined in accor-
(Continued)

(a)

(b)

dance with a resource pool to which the set resource region belongs.

11 Claims, 8 Drawing Sheets

Related U.S. Application Data on Oct. 6, 2013, provisional application No. 61/887,966, filed on Oct. 7, 2013, provisional application No. 61/901,457, filed on Nov. 8, 2013, provisional application No. 61/932,746, filed on Jan. 28, 2014, provisional application No. 62/018,655, filed on Jun. 29, 2014.

(51) Int. Cl.
*H04W 4/80* (2018.01)
*H04W 72/00* (2009.01)
*H04L 1/16* (2006.01)
*H04W 48/08* (2009.01)
*H04W 92/18* (2009.01)

(52) U.S. Cl.
CPC ........... *H04W 48/08* (2013.01); *H04W 72/00* (2013.01); *H04W 72/0473* (2013.01); *H04W 92/18* (2013.01)

(58) Field of Classification Search
USPC ...................................... 455/41.1, 41.2, 41.3
See application file for complete search history.

(56) References Cited

U.S. PATENT DOCUMENTS

| | | | | |
|---|---|---|---|---|
| 2011/0306349 A1* | 12/2011 | Hakola | ................ | H04W 28/04 455/450 |
| 2013/0016629 A1* | 1/2013 | Mallik | ................ | H04W 8/005 370/255 |
| 2013/0172036 A1 | 7/2013 | Miklos et al. | | |
| 2014/0094183 A1* | 4/2014 | Gao | ................ | H04W 72/048 455/450 |
| 2014/0370904 A1* | 12/2014 | Smith | ................ | H04W 8/005 455/450 |
| 2015/0131571 A1* | 5/2015 | Fodor | ................ | H04W 4/005 370/329 |
| 2015/0163729 A1* | 6/2015 | Seo | ................ | H04B 7/2656 370/336 |
| 2015/0365941 A1* | 12/2015 | Liu | ................ | H04W 72/0446 370/280 |
| 2016/0135200 A1* | 5/2016 | Brahmi | ................ | H04W 4/06 370/329 |

FOREIGN PATENT DOCUMENTS

| | | |
|---|---|---|
| WO | 2010085055 | 7/2010 |
| WO | 2013137580 | 9/2013 |

OTHER PUBLICATIONS

LG Electronics, Resource Allocation and UE Behavior for Discovery Type 1 and Type 2, R1-133388, 3GPP TSG RAN WG1 Meeting #74, Aug. 2013.

Intel Corporation, "On D2D Communication Design Aspects in Public Safety Scenarios", R1-132940, 3GPP TSG RAN WG1 Meeting #74, Aug. 2013, 9 pages.

European Patent Office Application No. 14850766.8, Search Report dated Apr. 21, 2017, 9 pages.

Fujitsu, "Discussion on D2D Discovery," R1-131933, 3GPP TSG RAN1 #73, May 20-24, 2013, 6 pages.

\* cited by examiner

FIG. 5
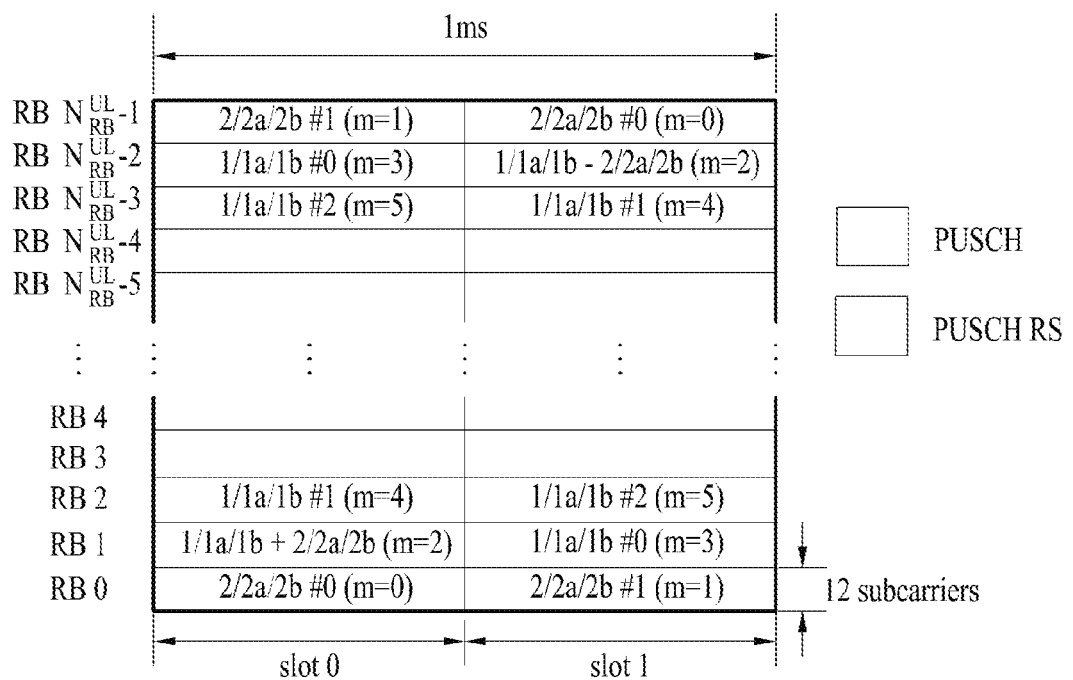
FIG. 6
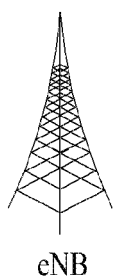
eNB

FIG. 8
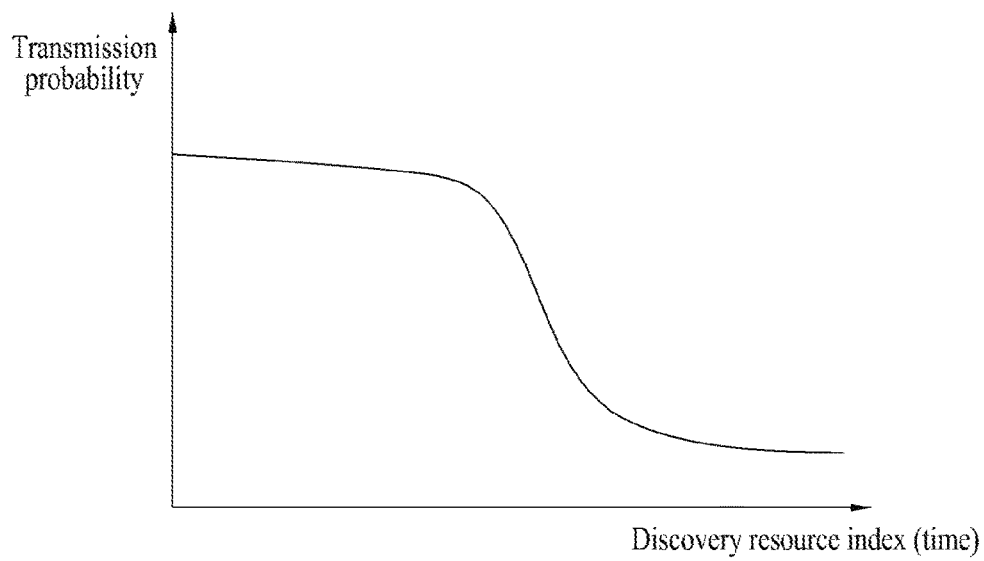
(a)
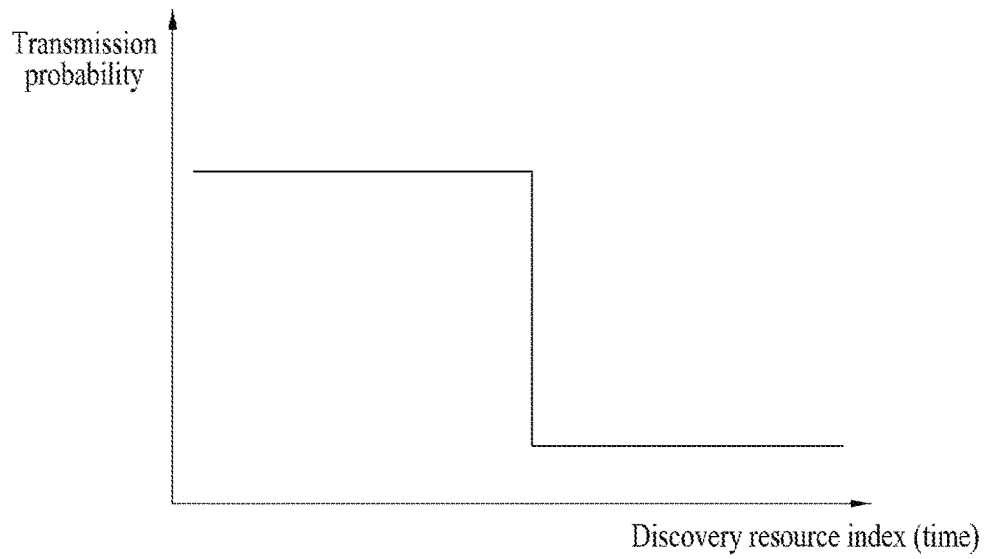
(b)

FIG. 9
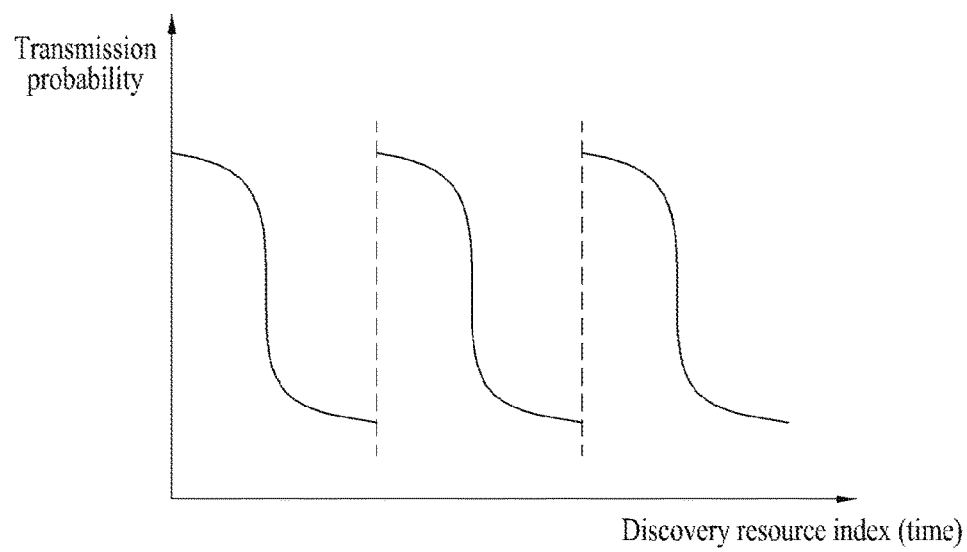
(a)
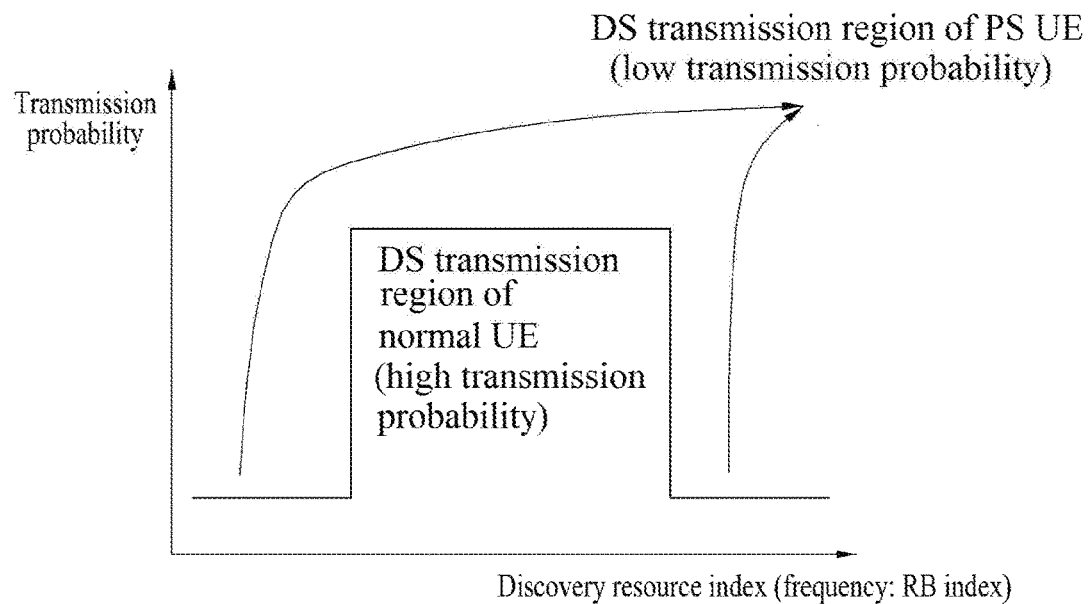
(b)

METHOD AND APPARATUS FOR TRANSMITTING SIGNAL FROM DEVICE-TO-DEVICE TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2014/009318, filed on Oct. 2, 2014, which claims the benefit of U.S. Provisional Application No. 61/885,536, filed on Oct. 2, 2013, 61/887,434, filed on Oct. 6, 2013, 61/887,966, filed on Oct. 7, 2013, 61/901,457, filed on Nov. 8, 2013, 61/932,746, filed on Jan. 28, 2014 and 62/018,655, filed on Jun. 29, 2014, the contents of which are all hereby incorporated by reference herein in their entirety.

TECHNICAL FIELD

The following description relates to a wireless communication system and, more specifically, to a method and apparatus for receiving a D2D signal on the basis of transmission probability in device-to-device (D2D) communication.

BACKGROUND ART

Wireless communication systems have been widely deployed in order to provide various types of communication services such as voice or data services. Generally, a wireless communication system is a multiple access system capable of supporting communication with multiple users by sharing available system resources (bandwidth, transmit power, etc.). Multiple access systems include, for example, a Code Division Multiple Access (CDMA) system, a Frequency Division Multiple Access (FDMA) system, a Time Division Multiple Access (TDMA) system, an orthogonal frequency division multiple access (OFDMA) system, a Single-Carrier Frequency Division Multiple Access (SC-FDMA) system, and a Multi-Carrier Frequency Division Multiple Access (MC-FDMA) system.

A device-to-device (hereinafter abbreviated D2D) communication corresponds to a communication scheme transmitting and receiving audio, data and the like between UEs without passing through an evolved Node B (hereinafter abbreviated eNB) by configuring a direct link between the UEs. The D2D communication can include such a communication scheme as a UE-to-UE communication scheme, a peer-to-peer communication scheme and the like. The D2D communication scheme can be applied to a M2M (machine-to-machine) communication, MTC (machine type communication) and the like.

The D2D communication is considered as a method of solving a burden of an eNB resulted from increasing data traffic. For instance, unlike a legacy wireless communication system, the D2D communication transmits and receives data between devices without passing through an eNB. Hence, the D2D communication can reduce network overload. Moreover, if the D2D communication is introduced, it may be able to expect reduced procedures of an eNB, reduced power consumption of devices participating in the D2D, increased data transmission speed, increased network capacity, load distribution, and enlarged a cell coverage and the like.

DISCLOSURE

Technical Problem

An object of the present invention is to provide a method for transmitting and receiving a D2D signal on the basis of transmission probability in (D2D) communication.

The technical problems solved by the present invention are not limited to the above technical problems and those skilled in the art may understand other technical problems from the following description.

Technical Solution

According to a first technical aspect of the present invention, a method for transmitting a device-to-device (D2D) signal by a UE in a wireless communication system includes: determining whether a D2D signal is to be transmitted on the basis of a transmission probability in a predetermined resource region; and transmitting the D2D signal in the predetermined resource region upon determining that the D2D signal is to be transmitted, wherein the transmission probability is determined according to a resource pool to which the predetermined resource region belongs.

According to a second technical aspect of the present invention, a UE for transmitting a D2D signal in a wireless communication system includes: a transmission module; and a processor, wherein the processor is configured to determine whether a D2D signal is to be transmitted on the basis of a transmission probability in a predetermined resource region and to transmit the D2D signal in the predetermined resource region upon determining that the D2D signal is to be transmitted, wherein the transmission probability is determined according to a resource pool to which the predetermined resource region belongs.

The first and second technical aspects may include all or part of the following.

The transmission probability may be set per resource pool.

The transmission probability may be derived from a predetermined transmission probability.

A transmission power parameter used when the UE selects the predetermined resource region in the resource pool and uses the selected resource region to transmit the D2D signal may differ from a transmission power parameter used when the UE transmits a D2D signal on a resource indicated by an eNB.

The transmission power parameter may be set per discovery type.

The transmission power parameter may include the sum $P_O$ of a cell specific component and a UE specific component and a path loss compensation value $\alpha$.

$P_O$ and $\alpha$ may be signaled to the UE through higher layer signaling.

The UE may identify the resource pool through a subframe bitmap.

The resource pool may be a set of subframes set to 1 in the bitmap, and the transmission probability may be indicated through a bitmap corresponding to bits set to 1 in the bitmap.

The transmission probability may be determined in consideration of one or more of an interference level measurement result and the number of D2D UEs.

The transmission probability may be equally divided for applications when the UE transmits the D2D signal per application.

A maximum number of transmittable D2D signals may be different for each application.

Advantageous Effects

According to the present invention, transmission and reception efficiency of D2D communication can be enhanced through D2D signal transmission on the basis of transmission probability and change of the transmission probability.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 illustrates mapping of PUCCH formats in uplink physical resource blocks;
FIGS. 6 to 9 are diagrams for illustrating transmission probability according to an embodiment of the present invention.

BEST MODE

Figure 1:
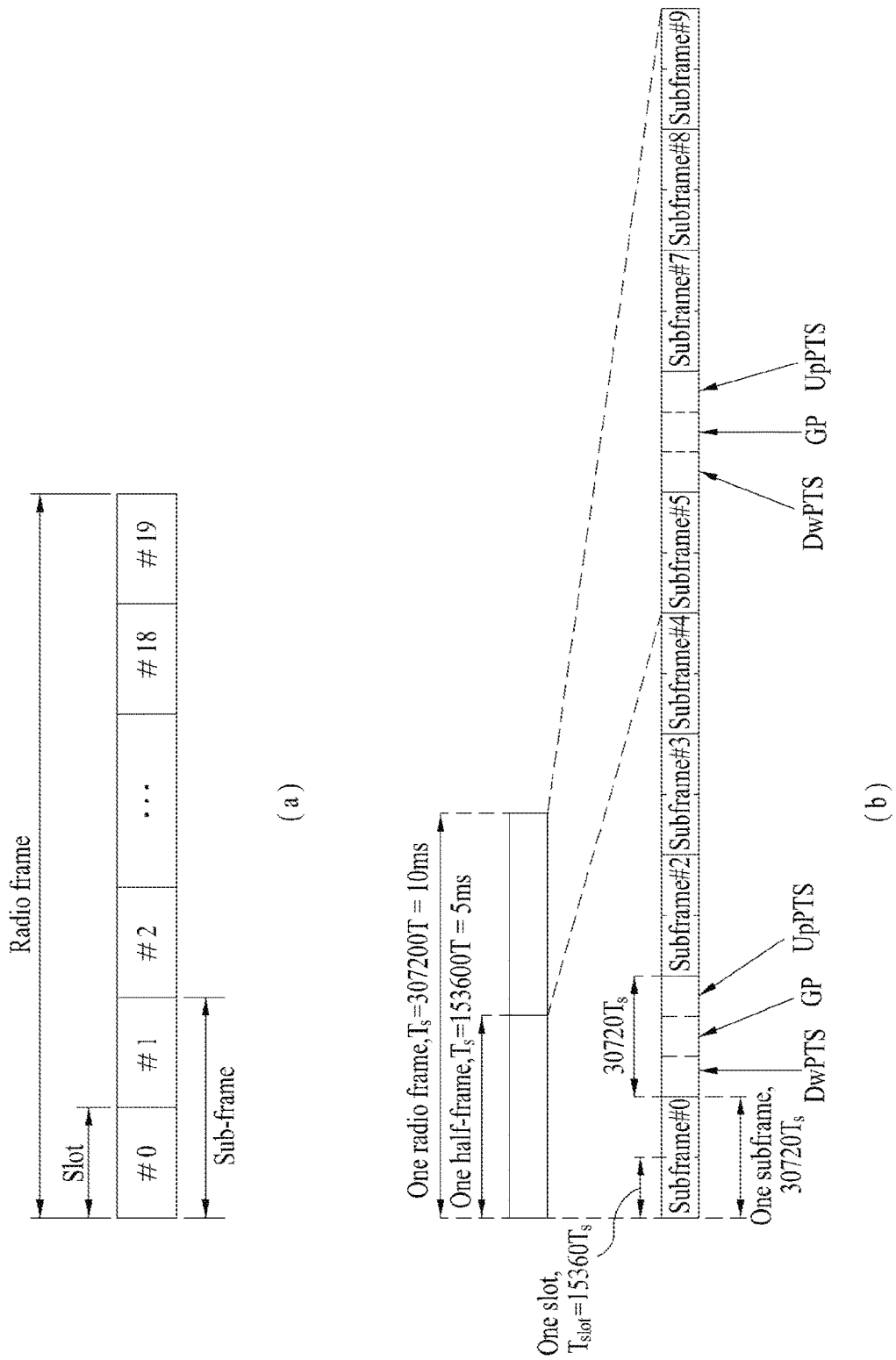
FIG. 1 illustrates a radio frame structure.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
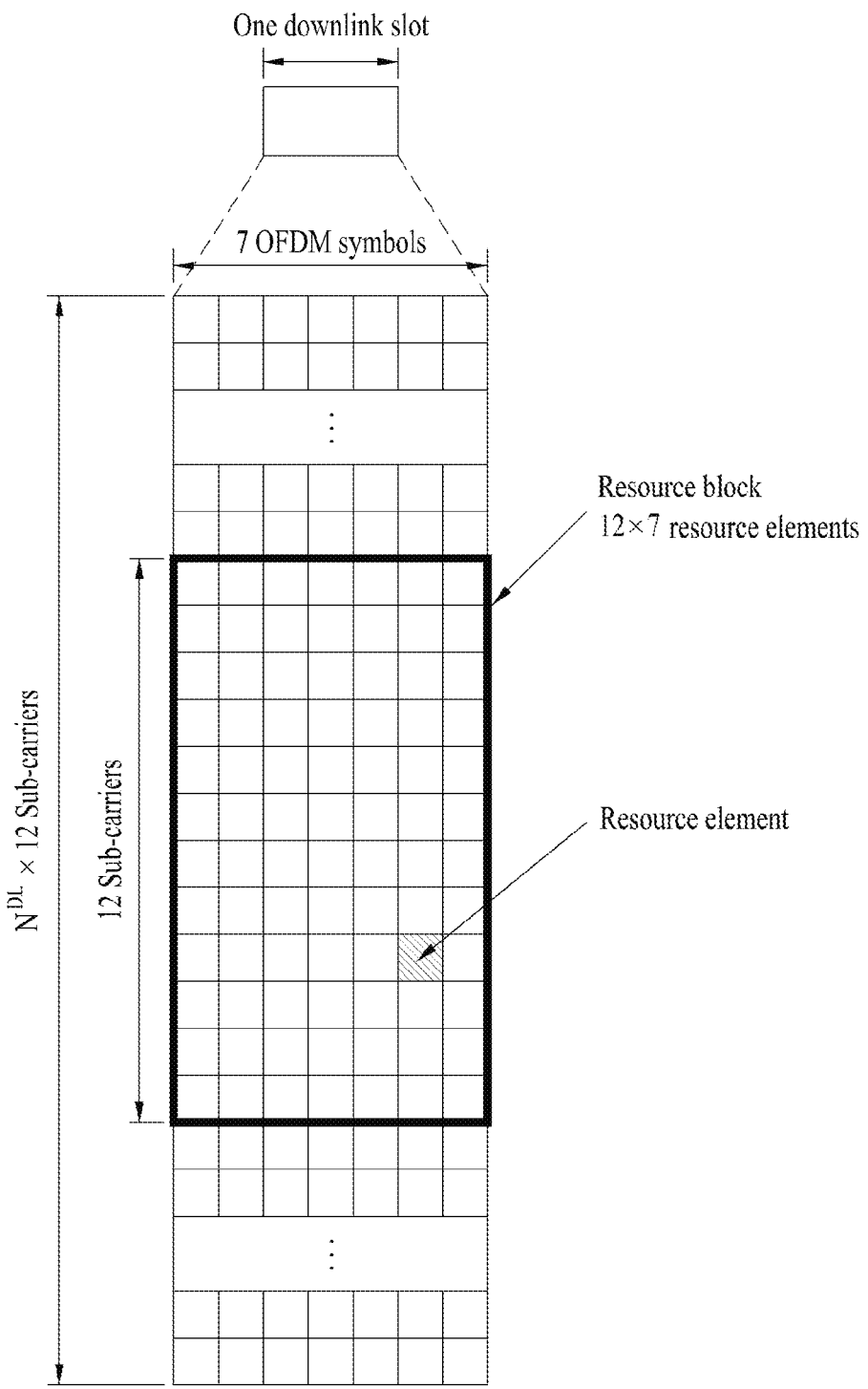
FIG. 2 illustrates a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
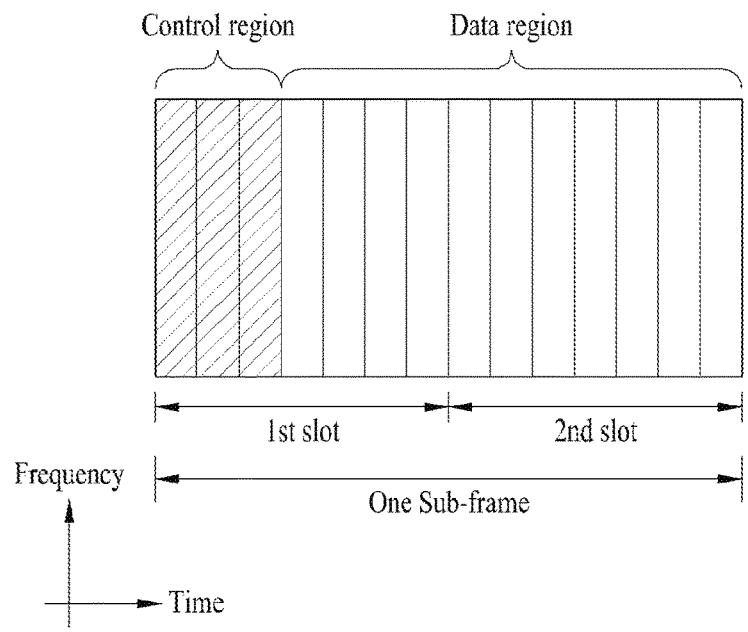
FIG. 3 illustrates a downlink subframe structure.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
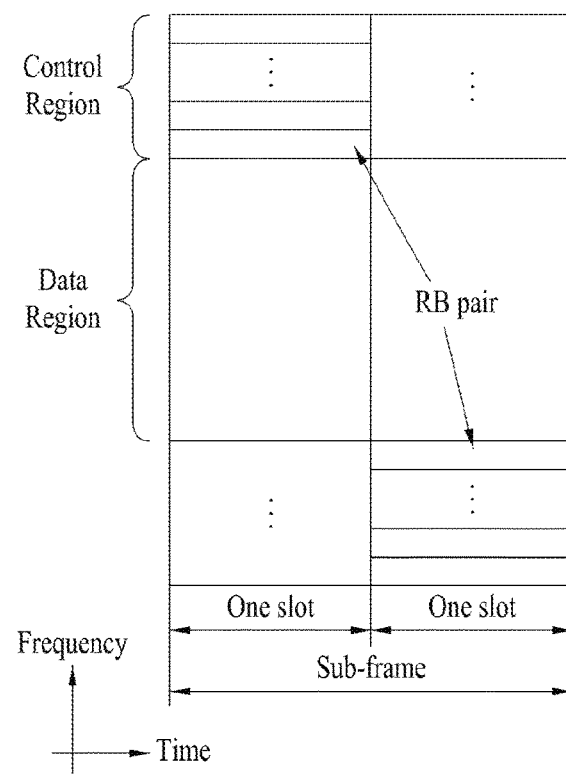
FIG. 4 illustrates an uplink subframe structure.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Physical Uplink Control Channel (PUCCH)

Uplink control information (UCI) transmitted through a PUCCH may include a scheduling request (SR), HARQ ACK/NACK information and downlink channel measurement information.

The HARQ ACK/NACK information may be generated according to whether a downlink data packet on a PDSCH has been successfully decoded. In a conventional wireless communication system, 1 bit is transmitted as ACK/NACK information for downlink single codeword transmission and 2 bits are transmitted as ACK/NACK information for downlink 2-codeword transmission.

Channel measurement information refers to feedback information related to MIMO (Multiple Input Multiple Output) and may include a channel quality indicator (CQI), a precoding matrix index (PMI) and a rank indicator (RI). Such channel measurement information may be commonly called CQI. 20 bits may be used per subframe for CQI transmission.

The PUCCH may be modulated using BPSK (Binary Phase Shift Keying) and QPSK (Quadrature Phase Shift Keying). Control information of a plurality of UEs can be transmitted through the PUCCH. When CDM (Code Division Multiplexing) is performed in order to discriminate signals of the UEs, a length-12 CAZAC (Constant Amplitude Zero Autocorrelation) sequence is used. Since the CAZAC sequence maintains a specific amplitude in the time domain and frequency domain, the CAZAC sequence is suitable for reducing PAPR (Peak-to-Average Power Ratio) or CM (Cubic Metric) of a UE to increase coverage. In addition, ACK/NACK information about downlink data transmission through the PUCCH is covered using an orthogonal sequence or an orthogonal cover (OC).

Control information transmitted on the PUCCH can be discriminated using cyclically shifted sequences having different cyclic shift (CS) values. A cyclically shifted sequence can be generated by cyclically shifting a base sequence by a specific CS amount. The specific CS amount is indicated by a CS index. The number of available CSs may depend on delay spread of a channel. Various types of sequences can be used as a base sequence, and the aforementioned CAZAC sequence is one example.

The amount of control information which can be transmitted by a UE in a single subframe can be determined by the number of SC-FDMA symbols available for control information transmission (i.e. SC-FDMA symbols except for SC-FDMA symbols used for reference signal (RS) transmission for coherent detection of the PUCCH).

In 3GPP LTE, the PUCCH is defined in 7 different formats according to transmitted control information, modulation scheme and the amount of control information. Table 1 shows properties of UCI transmitted according to PUCCH formats.

TABLE 1

| PUCCH format | Modulation Scheme | Number of bits per subframe | Usage | Etc. |
| --- | --- | --- | --- | --- |
| 1 | N/A | N/A | SR(Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI + ACK/NACK | Normal CP only |

TABLE 1-continued

| PUCCH format | Modulation Scheme | Number of bits per subframe | Usage | Etc. |
| --- | --- | --- | --- | --- |
| 2b | QPSK + BPSK | 22 | CQI + ACK/NACK | Normal CP only |

PUCCH format 1 is used for transmission of an SR alone. An unmodulated waveform is applied to transmission of an SR alone, which will be described in detail later.

PUCCH format 1a or 1b is used for HARQ ACK/NACK transmission. When HARQ ACK/NACK is transmitted alone in an arbitrary subframe, PUCCH format 1a or 1b can be used. HARQ ACK/NACK and an SR may be transmitted in the same subframe using PUCCH format 1a or 1b.

PUCCH format 2 is used for CQI transmission and PUCCH format 2a or 2b is used for transmission of a CQI and HARQ ACK/NACK. In an extended CP case, PUCCH format 2 may be used for transmission of the CQI and HARQ ACK/NACK.

FIG. 5 illustrates mapping of PUCCH formats to PUCCH regions in uplink physical resource blocks. In FIG. 5, $N_{RB}^{UL}$ denotes the number of resource blocks on uplink and $0, 1, \ldots, N_{RB}^{UL}-1$ denote physical resource block numbers. PUCCHs are mapped to both edges of uplink frequency blocks basically. As shown in FIG. 5, PUCCH formats 2/2a/2b are mapped to PUCCH regions indicated by m=0, 1, which represents that PUCCH formats 2/2a/2b are mapped to resource blocks located at band-edges. PUCCH formats 2/2a/2b and PUCCH formats 1/1a/1b may be mixed and mapped to PUCCH regions indicated by m=2. PUCCH formats 1/1a/1b may be mapped to PUCCH regions indicated by m=3, 4, 5. The number $N_{RB}^{(2)}$ of PUCCH RBs which can be used by PUCCH formats 2/2a/2b may be signaled to UEs in a cell through broadcast signaling.

Uplink Power Control

In LTE/LTE-A, uplink power control is applied for demodulation of uplink control information and data and can be divided into PUCCH power control, PUSCH power control and uplink sounding reference signal (SRS) power control.

PUCCH power control is determined in consideration of pathloss and maximum transmit power of UEs such that control information transmitted on a PUCCH is demodulated at a sufficiently low error rate.

Specifically, PUCCH power control can be performed in subframe i of cell c as represented by Equation 1.

$$P_{PUCCH}(i) = \min \left\{ \begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array} \right\} [dBm]$$ [Equation 1]

Here, $P_{CMAX,c}(i)$ denotes maximum transmit power of a UE and corresponds to the upper limit of a PUCCH power control command.

$P_{0\_PUCCH}$ denotes a PUCCH transmit power value that an eNB wants to receive. This value is transmitted as a UE-specific parameter through higher layer signaling and determined by the sum of a nominal power value $P_{O\_NOMINAL\_PUCCH}$ and $P_{O\_UE\_PUCCH}$.

$PL_c$ is a pathloss value in cell c and is estimated by a UE. This value can be estimated by the UE by measuring receive power of a downlink cell-specific reference signal (CRS).

$h(n_{CQI}, n_{HARQ}, n_{SR})$ is a value dependent on a PUCCH format. Here, $n_{CQI}$ denotes the number of bits indicating channel quality information, $N_{HARQ}$ denotes the number of HARQ bits, and $n_{SR}$ is 1 when subframe i is configured for scheduling request and 0 otherwise. $h(n_{CQI}, n_{HARQ}, n_{SR})$ is dependent on PUCCH format. Specifically, $h(n_{CQI}, n_{HARQ}, n_{SR})$ may be i) 0 in the case of PUCCH formats 1, 1a and 1b, ii)

$$\frac{(n_{HARQ} - 1)}{2}$$

when one or more serving cells are used in PUCCH format 1b and iii)

$$10 \log_{10}\left(\frac{n_{CQI}}{4}\right)$$

when normal cyclic prefix is used in PUCCH formats 2, 2a and 2b.

$\Delta_{F\_PUCCH}(F)$ is a value signaled from a higher layer in consideration of MCS. This value indicates that different signal-to-noise-plus-interference ratios (SINR) are necessary according to the number of bits per subframe and different error rates depending on PUCCH formats.

$\Delta_{TxD}(F')$ is a power offset signaled by a higher layer when a PUCCH is transmitted using two antenna ports and is dependent on PUCCH format.

g(i) is a current PUCCH power control state accumulation value and is determined by a power value $\Delta_{PUCCH}$ corresponding to a transmit power control command field value included in a DCI format transmitted on a PDCCH, and a PUCCH power) control state value g(i−1) of the previous subframe.

PUSCH power control when PUCCH transmission is not performed can be determined, as represented by Equation 2.

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\}$$ [Equation 2]

[dBm]

$P_{CMAX,c}(j)$ denotes maximum transmit power of a UE and $M_{PUSCH,c}(i)$ denotes a PUSCH transmission bandwidth represented by the number of RBs.

$P_{O\_PUSCH,c}(j)$ denotes a PUSCH transmit power value that an eNB wants to receive. This value is determined by the sum of a nominal power value $P_{O\_NOMINAL\_PUCCH}$ and $P_{O\_UE\_PUCCH}$. This value is determined as j=0 in the case of semi-persistent scheduling, j=1 in the case of dynamic scheduling and j=2 in the case of random access response.

$\alpha_c(j) \cdot PL_c$ denotes downlink pathloss. Here, $PL_c$ is a value estimated by the UE, and $\alpha_c(j)$ is a pathloss compensation value transmitted through higher layer signaling. $\alpha_c \in \{0, 0.4, 0.5, 0.6, 0.7, 0.8, 0.9, 1\}$ when j is 0 or 1 and $\alpha_c(j)=1$ when j is 1.

$\Delta_{TF,c}(j)$ is a value calculated using a value transmitted through higher layer signaling, bit per resource element (BPRE) and the numbers of bits of a CQI and a PMI.

$f_c(i)$ is an accumulation value and is determined by a power value $\delta_{PUSCH}$ corresponding to a transmit power control (TPC) command field value included in a DCI format transmitted on a PDCCH, $K_{PUSCH}$ according to FDD and TDD and an accumulation value $f_c(i-1)$ up to the previous subframe.

When PUSCH transmission is performed along with PUCCH transmission, PUSCH power control is represented by Equation 3.

$$P_{PUSCH,c}(i) = \min\left\{\begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\}$$ [Equation 3]

[dBm]

$\hat{P}_{CMAX,c}(i)$ is a linear value for $P_{CMAX,c}(i)$ and $\hat{P}_{PUCCH,c}(i)$ is a linear value in PUCCH power control determined by Equation 1. Other parameters have been described above.

D2D Signal Transmission According to Transmission Probability

A description will be given of a method for transmitting and receiving D2D signals between UEs, as shown in FIG. 6, on the basis of the above description. While a method for transmitting and receiving a discovery signal will be described in the following, the present invention is not limited thereto and can be equally/similarly applied to D2D communication signal transmission and reception, D2D synchronization signal transmission and reception and the like. In the following description, "eNB" is used to mean a device that refers to a scheduling node, a cluster header or the like. If an eNB or a relay transmits a signal transmitted by a UE, the eNB or relay can be regarded as a UE.

A D2D UE according to an embodiment of the present invention may determine whether to transmit a D2D signal on the basis of a transmission probability in a predetermined resource region and transmit the D2D signal in the predetermined resource region upon determining transmission of the D2D signal. That is, the D2D UE performs D2D signal transmission according to transmission probability. Here, the transmission probability for determining whether to transmit the D2D signal may be decided according to a resource pool to which the predetermined resource region belongs. That is, the transmission probability may be set per resource pool. More specifically, when n resource pools are set for transmission and reception of D2D discovery signals, a transmission probability can be set for each of the n resource pools. In addition, the transmission probability may be a value preset by an eNB or a value derived from the value, as described later.

A resource pool may refer to time-frequency resources for transmission of D2D signals (e.g. discovery signals, scheduling assignment (SA), data and the like). The resource pool may be configured in the form of a subframe bitmap. For example, the resource pool can be signaled to a UE as a bitmap in the unit of a radio frame, such as [1111100000]. Here, a subframe corresponding to 1 may be a subframe for D2D signal transmission. When the resource pool is signaled as a bitmap, a transmission probability may be indicated by a bitmap corresponding to bits set to 1 in the above bitmap. For example, a transmission probability with respect to 5 subframes set to 1 in the resource pool [1111100000] can be indicated by a bitmap of [11000]. In the transmission probability bitmap, 1 may correspond to a subframe having a transmission probability higher than a predetermined value, whereas 0 may correspond to a subframe having a transmission probability lower than the predetermined value. Alternatively, 1 may indicate transmission all the time, whereas 0 may indicate no transmission. A specific UE group may be set to [11000] and another specific UE group may be set to [00111]. That is, resource regions for transmission may be separated for the respective UE groups in the time domain. In the above description, the method of controlling load of a discovery signal by applying a transmission probability in a resource region may be implemented as a method of allocating a plurality of transmission resource regions and controlling the number of UEs per transmission resource region. For example, considering a case in which a single resource region is set and all D2D UEs transmit signals in the resource region and a case in which 3 resource regions (each of which has the same size as the single resource region) are set and the number of UEs transmitting signals in the resource regions is divided by 3, a transmission probability per resource region in the latter case is reduced to ⅓ of the former case. According to this method, a resource region has load similar to load when a transmission probability of ⅓ is allocated to the resource region. In this method, a resource region in which a specific UE group transmits signals may be signaled in the form of a bitmap as in the above example. In the above example, if resource regions 1, 2 and 3 are present, UE group 1 can be configured to transmit signals in resource region 1, UE group 2 can be configured to transmit signals in resource region 2, and UE group 3 can be configured to transmit signals in resource region 3. That is, a transmission probability control method can be implemented in such a manner that a network indicates whether transmission is to be performed per resource region.

The resource pool may be defined in the time domain, as described above, or defined in the frequency domain. That is, only part of a system bandwidth may be defined as a resource pool. For example, only k RB/PRB pairs at both ends of the entire frequency band can be used as a resource pool for D2D transmission.

Change of Transmission Probability

Figure 7:
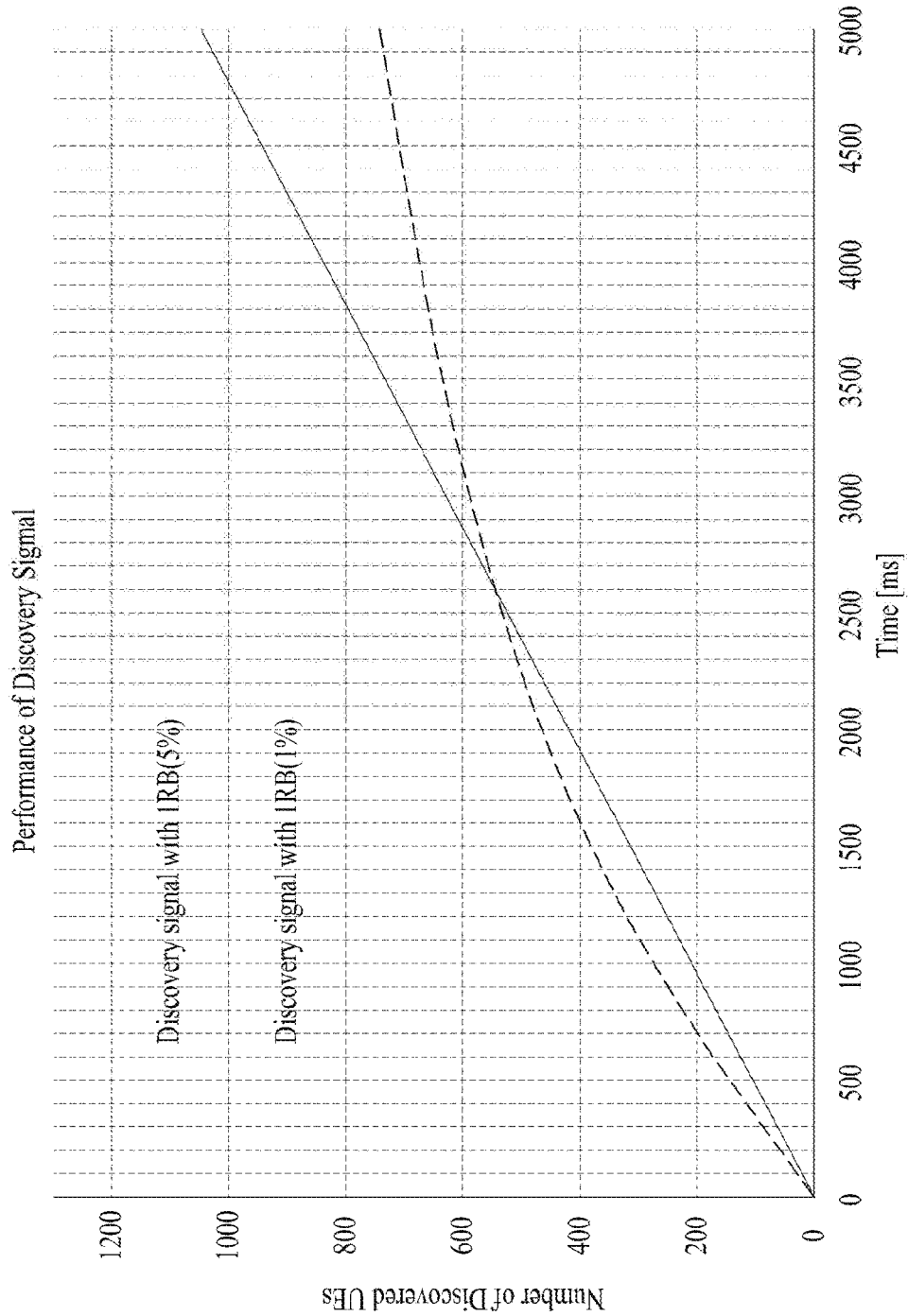

FIG. 7 is an experimental result showing changes in transmission probability and the number of discovered UEs with time. Experiments were performed in an environment having 19 sites, 3 sectors, macro inter-site distance=500 m, 150 UEs per sector=8550 UEs in total, 50 RBs, a discovery signal unit of 1 RB, code rate=0.42, random determination of discovery transmission resources by UEs in discovery subframes at an interval of a turbo code of 40 ms, and transmission probabilities of 1% (solid line) and 5% (dotted line). A transmission probability of 1% indicates that, on average, 86 UEs randomly select discovery signals of 1 RB within 50 RBs and transmit the discovery signals and a transmission probability of 5% indicates that, on average, 427 UEs randomly select 1 RB within 50 RBs and transmit the 1 RB. Referring to FIG. 8, when a transmission probability is low, while a UE discovery speed is low initially, the number of discovered UEs increases with time. When the transmission probability is high, interference increases with time and thus a discovery range is reduced. Accordingly, discovery effect can be maximized by changing transmission probability according to resource (time).

Specifically, a transmission probability in a resource pool may be changed, as described below. Furthermore, a transmission probability in consecutive resource pools may be changed, as described below. A transmission probability may be applied per resource. For example, a plurality of resource regions can be allocated and different transmission probabilities can be respectively applied to the resource regions. Alternatively, discovery signal transmission frequency of a UE can be varied according to time or frequency within a single resource region.

A transmission probability may have a large value in an initial resource and may have a small value after a predetermined time. Accordingly, neighboring UEs can be rapidly discovered through transmission with a high transmission probability in the initial stage (fast discovery) and distant UEs can be discovered after a predetermined time (wide discovery). If the initial high transmission probability is maintained, it is difficult to discover distant UEs due to interference. Accordingly, the transmission probability changes with time, as described above. (In the case of transmission of a sensing based discovery signal, the discovery signal can be transmitted with a low transmission probability in a specific region due to a low threshold, whereas the discovery signal can be frequently transmitted in another resource due to a high threshold even if interference is high.) FIG. 8 illustrates an example of change of transmission probability from an initial high transmission probability to a low transmission probability at a specific time. The transmission probability may be continuously changed, as shown in FIG. 8(a), or discontinuously (stepwise) changed, as shown in FIG. 8(b). In this manner, the transmission probability is simply set per resource region.

A transmission probability may be changed in frequency resources. For example, discovery signals can be transmitted with a low transmission probability in a predetermined region of a frequency resource, whereas discovery signals can be transmitted with a high transmission probability in the remaining region. In other words, a plurality of resource regions is set as frequency regions and different transmission probabilities are applied to the respective resource regions. For example, each UE can be instructed to transmit a discovery signal with different transmission probabilities in frequency resource regions and can determine whether to transmit the discovery signal in each resource region through coin tossing. When a resource region assigned a high transmission probability is referred to as resource region A, a resource region assigned a low transmission probability is referred to as resource region B, and discovery signals are instructed to be transmitted in both resource region A and resource region B, a UE can be previously configured to transmit discovery signals in both the resource regions or only one of the resource regions A and B. (For example, discovery signals are transmitted in resource region B all the time when discovery signals are permitted to be simultaneously transmitted in resource regions A and B.)

Alternatively, the transmission probability may be periodically changed, as shown in FIG. 9(a). When the transmission probability is changed with time, the quantity of interference decreases or increases in a corresponding resource region only when all discovery UEs simultaneously start discovery procedures. However, a specific UE may start the discovery procedure at a different time. For this reason, periodicity is provided to transmission probability change. Specifically, a transmission probability per resource (subframe) can be previously signaled to each UE on the assumption that each UE is aware of resource (subframe) indices of a D2D discovery time resource set (e.g. subframe set). If a specific UE starts discovery operation at a subframe n, the UE can preferentially discover a UE at a distance therefrom when the subframe corresponds to a low transmission probability region and then discover a UE close thereto in a high transmission probability region.

Alternatively, transmission probability change may be subdivided more than in the aforementioned example. Specifically, while transmission probabilities of two values, a large value and a small value, may be set, different transmission probabilities can be respectively applied to N resource regions. For example, an RB region in which DC carriers are transmitted suffers higher interference due to in-band emission than other RB regions. In this case, coverages of UEs which transmit discovery signals in the corresponding region become narrower than those when the UEs transmit discovery signals in other RB regions, and thus smooth UE discovery may not be performed. Accordingly, an RB region suffering in-band emission interference due to DC carriers may be configured to carry discovery signals with a lower transmission probability than other RB regions. Conversely, an RB region in which DC carriers are transmitted may be configured to carry discovery signals with a higher transmission probability than other RB regions, considering that the RB region has high interference.

Alternatively, it is possible to change only a transmission probability for a specific UE or UE group according to resource rather than simultaneously changing transmission probabilities for all UEs. For example, if it is difficult to discover a specific UE, the UE can be successively discovered by ramping the transmission probability for the UE. Alternatively, a specific UE or UE group may be configured to always have a higher (or lower) transmission probability than other UEs. For example, when D2D UEs form a single cluster, a discovery signal transmitted by a cluster head can be transmitted with a higher transmission probability than discovery signals of other UEs. For example, when discovery of a specific UE is difficult, the number of times of transmitting a discovery signal in a previous discovery subframe M is counted and, when the counted number is less than a predetermined level, the UE is enabled to transmit the discovery signal with a high transmission probability. Conversely, when the counted number is less than the predetermined level, the UE is enabled to transmit the discovery signal with a low transmission probability.

A transmission probability may be set per UE or UE group. Alternatively, a discovery transmission region in which only a specific UE or UE group can transmit a discovery signal with a predetermined transmission probability may be signaled. For example, as shown in FIG. 9(b), regions at both ends of a discovery region may correspond to regions in which UEs that need to secure a wide discovery range (e.g. public safety (PS) UEs) transmit discovery signals with a low transmission probability and the remaining frequency resource region may correspond to a region in which normal UEs transmit discovery signals with a high transmission probability. Here, the region in which normal UEs transmit discovery signals may be divided into N resource regions and different transmission probabilities may be applied to the respective resource regions.

When frequency hopping is applied, it is possible to apply a higher transmission probability to a specific UE or a specific resource by allocating a plurality of hopping seeds.

Alternatively, a discovery signal unit size may be set per resource set/resource pool. Furthermore, different aggregation levels may be set for the same transmission probability. For example, it is possible to cause a low collision probability (wide discovery range) in set A using a transmission probability of 1% at AL=1 (AL=1 assumes 1 RPB pair) and to enable a near UE to be rapidly discovered although collision probability is high in set B using a transmission probability of 5% at AL=2. This may be implemented by setting different ALs and transmission probabilities with time in one set. For example, when N discovery subframes are configured, transmission can be performed with a transmission probability of 5% at AL=2 in N−1 subframes and transmission can be performed with a transmission probability of 1% at AL=1 in the N-th subframe. This can be interpreted as setting a unit size per discovery type. For example, 2 RBs can be set to a discovery unit in the case of type 1 (in which a UE selects a resource region in a resource pool and transmits a D2D signal in the resource region) and 3 RBs can be set to a discovery unit in the case of type 2 (in which a UE transmits a D2D signal on a resource indicated by an eNB). Alternatively, the number of repetitions in the time domain may be set per discovery resource region or discovery type.

In the above description, transmission probability control may entail setting a threshold for determining whether to transmit a discovery signal. In addition, application of a bitmap or setting of a maximum number of transmissions by an eNB may be considered to be transmission probability control.

Determination of Transmit Power/Transmit Power Parameter

Transmit power/transmit power parameter may be set per resource pool and/or type/mode simultaneously with or independently of transmission of a D2D signal by a UE on the basis of a transmission probability determined according to a resource pool.

The transmit power parameter may be independently set per discovery signal transmission type. For convenience of description, a scheme in which an eNB notifies a UE of only a D2D signal transmission region and the UE selects a specific resource in the D2D signal transmission region and transmits a signal through the selected region is referred to as type 1 and a scheme in which the eNB directly signals resources to be used for D2D signal transmission to D2D signal transmitting UEs through physical layer or higher layer signaling is referred to as type 2. For example, a transmit power parameter used in type 1 may differ from a transmit power parameter used in type 2. That is, the transmit power parameter can be set per D2D resource allocation scheme. In addition, transmit power parameters may be independently or differently set according to resource pools (or resource regions). For example, transmission can be performed with transmit power P_A (e.g. 23 dBm) in discovery resource pool A, whereas transmission can be performed with transmit power P_B (e.g. 10 dBm) in discovery resource pool B. In other words, $P_O$=23 dBm and $\alpha$=0 can be set to discovery resource pool A and $P_O$=10 dBm and $\alpha$=0 can be set to discovery resource pool B with respect to open loop power control parameters $P_O$ and $\alpha$.

Here, transmit power parameters which can be independently set per resource pool or type/mode may include $P_O$ which is the sum of a cell-specific power component and a UE-specific power component and $\alpha$ which is a pathloss compensation value. $P_O$ and $\alpha$ may be independently set through higher layer signaling or physical layer signaling.

In a similar context, when the CP length of D2D equals the CP length of WAN and when the CP lengths differ from each other, a UE may transmit a discovery signal with different power values (or different power parameters). If a power control parameter is set per discovery transmission resource and discovery transmission type, and the CP lengths of WAN and D2D differ from each other in the above example, a predetermined offset may be applied to a previously set power control parameter or an additionally set power control parameter may be used. That is, transmit power is set in consideration of the fact that ICI caused by different CP lengths between WAN and D2D additionally has impact on WAN and/or the level of interference generated in D2D transmission and reception due to the CP length of WAN, which differs from that of D2D.

Transmission Probability/Transmit Power Parameter Signaling and Determination Method The aforementioned transmission probability/transmit power parameter may be determined and/or signaled through the following methods.

An eNB may periodically sense a discovery transmission region, measure an average interference level (e.g. IoT level, IoT meaning a ratio between the total received power spectral density Io, including signal and interference, and the thermal noise level N0, T being a channel gain) and use the average interference level to control the transmission probability/transmit power parameter.

Alternatively, the eNB may previously recognize the average number of D2D UEs controlled thereby and use the number to set transmission probability. Each UE may notify the eNB that the UE is a D2D UE or intends to perform D2D communication prior to D2D communication. For example, the eNB can signal only a value and transmit a discovery signal with a low (or high) probability by biasing the value by a predetermined value (subtracting or adding the predetermined value from or to the value) in a specific resource region.

Alternatively, the eNB may not directly signal transmission probability and UEs may sense surrounding interference levels and set transmission probabilities in a dispersive manner. For example, in every P-th subframe from among discovery subframes, all UEs can transmit discovery signals with transmission probabilities lower (or higher) than transmission probabilities previously applied thereby (or set by the UEs). Alternatively, the eNB may signal a threshold of SINR (or INR interference to noise ratio or interference power level) and transmission probability may be increased or decreased when an interference level sensed by a UE which has received the SINR threshold exceeds the threshold.

Furthermore, the eNB may not directly signal transmission probability and each UE may sense a surrounding interference level and report the interference level or SINR to the eNB. Such reporting may be indicated by the eNB or triggered by the UE. Reporting methods may include periodic reporting, aperiodic reporting and event triggered reporting (e.g. the UE reports interference information only when a specific ID is discovered or specific conditions are satisfied). Only a specific UE may be selectively instructed or all D2D UEs participating in discovery may be instructed to perform such interference information reporting. Alternatively, a specific UE may deliver interference information of neighboring UEs to the eNB. Furthermore, interference information per discovery resource may be reported to the eNB. Indication of reporting may be triggered by higher layer or physical layer signaling.

When Discovery Signals for a Plurality of Applications are Transmitted

A description will be given of a case in which a UE transmits a plurality of discovery signals for a plurality of applications. In this case, a plurality of different discovery signals may be transmitted. For example, if a service ID (application ID) and a discovery signal ID are used as inputs of a single coding chain when a single discovery signal is generated, a codeword generated according to the coding chain may depend on the service ID. If ID fields (UE ID and service ID) use separate coding chains, additional CRC may be required, which causes discovery signal coding rate increase. Furthermore, when IDs use separate coding schemes, codeword fragmentation may occur, deteriorating channel coding efficiency. Accordingly, it is assumed that a UE generates a discovery signal using a single coding chain unless mentioned otherwise.

When a specific UE transmits a discovery signal for requesting another UE to discover the specific UE and when a discovery signal is transmitted as a reply to the specific UE, different codewords can be generated although the same UE ID and the same service ID are used. For example, a codeword can be generated by hashing the service ID and using part of information about the corresponding service and the UE ID for the discovery signal for request, whereas a codeword can be generated using the service ID (or another hashing scheme) and the UE ID for the discovery signal for reply. That is, the discovery signal for reply and the discovery signal for request generate different codewords although the discovery signals are associated with the same service and the same UE ID. Different discovery signals may be regarded as different services. The following description conforms to the aforementioned definition unless mentioned otherwise.

If a UE transmits discovery signals corresponding to different codewords for a reason other than the aforementioned reason and a UE receiving the discovery signals does not know the reason, the UE attempts to combine the received discovery signals, which causes discovery performance deterioration. To prevent this, the following UE operations may be performed. A reception UE a) always detects a discovery signal separately from a discovery signal received at a different time or in a different frequency resource, b) detects a field indicating an application ID or application type, included in each discovery signal, and then determines whether to combine received discovery signals, c) combines only discovery signals with respect to the same application, and d) combines specific fields (at logarithm of the likelihood ratio (LLR) level) even though discovery signals are related to different applications (services) if the discovery signals are configured in the form of UE ID+service ID.

A transmission UE may operate as follows. a) When a UE is instructed to semi-statically transmit a discovery signal of a specific application in a specific subframe (e.g. in a semi-persistent scheduling manner—periodically transmitting a discovery signal in a specific subframe), if the UE selects a subframe from subframes configured to carry discovery signals of other applications and transmits a discovery signal through the selected subframe, the UE may transmit a plurality of discovery signals in one subframe. In this case, only one of a plurality of discovery signals is transmitted according to predetermined priority. Here, when the priority is not set, one of the discovery signals may be randomly selected and transmitted, or the first discovery signal or a discovery signal in predetermined order may be transmitted. b) When multiple discovery signals are simultaneously transmitted, a plurality of discovery signal codewords (or a specific discovery sequence) can be transmitted in consecutive RBs including one of frequency positions of a discovery signal destined to be transmitted or, if predetermined frequency positions are not present, consecutive RBs in an arbitrary frequency RB in order to maintain single carrier property. c) If a specific UE transmits discovery signals for different services, discovery transmission frequency can be set per service instead of per UE. d) If a specific UE transmits discovery signals for different services, discovery transmission frequency per service can be set to be different from discovery transmission frequency when one UE transmits a discovery signal only for one service.

Figure 10:
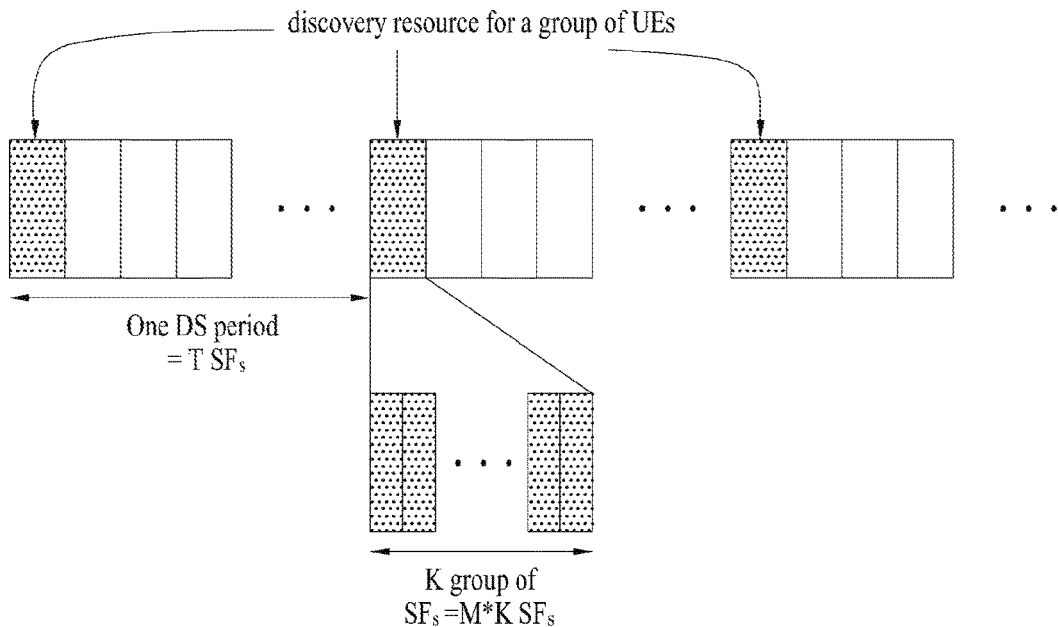
FIG. 10 is a diagram for illustrating a resource pool according to an embodiment of the present invention.

A subframe (or the aforementioned resource pool) in which a discovery signal is transmitted may be configured by a network or an eNB. When the subframe has periodicity, the subframe can be represented by three parameters: a discovery period T corresponding to a discovery resource group transmission period; a discovery resource group M*K SFs per period, which corresponds to a set of time-frequency resources for discovery; and a discovery resource sub-group (M size) obtained by dividing discovery resource groups by M sets according to a specific rule. FIG. 10 illustrates an example of representing a subframe in which a discovery signal is transmitted using the three parameters. While FIG. 10 shows that discovery subframes are continuously arranged within one discovery period, the discovery subframes may be discontinuous. If a maximum of P (P being a predetermined value including 1) discovery signals are transmitted per discovery period irrespective of the number of applications, the number of discovery signals transmitted in one period is not varied according to the number of applications of a UE. In this case, a UE having a large number of applications has increased discovery signal delay. In addition, a maximum number of discovery signals which can be transmitted per discovery period may be limited. In this case, different numbers of transmittable discovery signals can be set according to UE applications. When this is applied to a discovery transmission UE, the UE can transmit a signal through round robin per application. Alternatively, discovery signals of as many applications as a maximum number of transmissions, from among applications, may be selected and transmitted. Alternatively, a maximum of N discovery signal transmissions per application may be configured per group in each period. Here, a rule may be set such that discovery signals for different applications are transmitted per group, and N may be a predetermined value including 1.

When a UE transmits a plurality of discovery signals for a plurality of applications, a transmission probability and a transmission period can be reset.

The UE may divide a transmission probability applied thereto per application. Here, equal division and division according to a predetermined ratio can be used to divide the transmission probability. For example, when a transmission probability of 1% is applied to a UE which executes three SNS applications, a discovery signal transmission probability per application can be 0.33 (equal division). If importance or priority of a specific application is high, a discovery signal with respect to the specific application can be set to a higher transmission probability. When a specific UE is configured by an eNB to transmit a discovery signal with a specific probability P, if the UE generates discovery signals by executing M applications, the UE can transmit a discovery signal with probability P per application. Here, a rule may be set such that the UE transmits only one discovery signal or transmits all discovery signals in consecutive resource regions when transmission points overlap. In this case, the corresponding UE transmits a larger number of discovery signals as the number of applications increases. From the viewpoint of a specific operator, a specific UE may be charged a large amount by permitting a larger number of applications for the specific UE.

A UE may reset a transmission period. For example, the UE can transmit a discovery signal through round robin. Specifically, when a specific UE is configured to transmit a discovery signal per subframe (or discovery frame) with period N or discovery resource region with period N (or when N repeated transmissions are configured in one discovery period), if the number of applications is M, a discovery signal with respect to the corresponding application can be transmitted per application in subframe period MN (or discovery resource region period MN). Alternatively, if a specific UE transmits a discovery signal in period M (subframe or resource region period), the UE may transmit discovery signals in the same period for different applications at different transmission points. In other words, the aforementioned two methods respectively determine discovery transmission time from the viewpoint of UE and from the viewpoint of application.

If a UE can be aware of a period with respect to the number of applications (e.g. a discovery reception UE is previously informed of the number of applications of a discovery transmission UE or detects a field with respect to the number of applications in a discovery signal to recognize the number of applications), the reception UE can combine discovery signals transmitted between identical applications. If discovery transmission time is determined on the basis of one application all the time, the reception UE can combine discovery signals with respect to the application in period M all the time. Alternatively, even if the reception UE is not aware of the number of applications of the transmission UE, when the maximum number M of applications with respect to discovery signals which can be transmitted by one UE is limited or the reception UE recognizes that at least one transmission occurs per application within a specific discovery subframe period N*M, the reception UE can combine discovery signals transmitted in at least period N*M. For example, if the transmission UE executes three applications and transmits a maximum of three different discovery signals through round robin and a discovery transmission period is 100 subframes, the transmission UE transmits discovery signals with respect to the same application once for at least 300 subframes. Here, although a UE receiving discovery signals transmitted from the transmission UE cannot combine every discovery signal, the UE can combine discovery signals received in a period corresponding to 300 subframes.

Alternatively, a threshold for determining whether transmission is to be performed may be reset. That is, when a discovery signal transmission resource is determined by detecting energy with respect to interference, an energy selection criterion can be changed according to the number of applications. For example, if a discovery signal is transmitted in a resource region in which energy of less than P % is detected when one application is present, a resource region in which energy of less than Q % (e.g. Q=M*P %) is detected can be set to a region in which a discovery signal can be transmitted when the number of applications is M. That is, discovery signals are transmitted with higher frequency as the number of applications increases.

Even though discovery signals are generated for different applications, specific regions of the discovery signals may be composed of the same information. For example, when specific discovery signals are configured in the form of device ID+service ID, the device ID is identical and thus device IDs of the discovery signals can be combined even though the discovery signals are generated for different applications. Accordingly, a log likelihood ratio for device IDs can be set such that a reception UE can combine the device IDs. If discovery signal transmission resources are determined by an eNB, a UE may send a request for information about the number of services to the eNB. Here, the information may be interpreted as the number of services transmitted in one discovery resource or the number of resource units which are service-specifically required. For example, when a specific UE executes M applications and the eNB requests that the specific UE transmit M discovery signals for the M applications, the eNB can configure M discovery resources for the UE.

As described above, when as many discovery signals as the number of applications are transmitted, a reception UE may combine the discovery signals. In this case, the discovery signals may include elements for specifying the different applications.

If a discovery signal transmission UE transmits a discovery signal for an application different from a previously transmitted discovery signal, the UE includes a new discovery signal indicator (NDI), an application ID and/or a UE ID in the discovery signal and transmits the discovery signal. Alternatively, the UE may include a specific bitstring obtained by combining the application ID, NDI and/or UE ID (e.g. using all or part of the information mentioned as inputs of a hashing function) in the discovery signal and transmit the discovery signal. This process may be implemented in such a manner that an NDI bit size is extended to M bits, a random number is selected from numbers which can be represented with M bits and included in a discovery signal for a different application when the discovery signal is transmitted, and another random number is selected and included in a discovery signal for a changed application when the application is changed. To improve detection performance when the application is changed, a rule may be set such that N bits or more (or less) from among the M bits must be simultaneously changed when the application is changed. When an M-bit random number is selected, a UE ID and an NDI may be used as seed values of a random sequence generator in order to prevent collision by generating different random numbers for different UE IDs. For example, while discovery resources are hopped in a specific pattern in the frequency domain, if a specific UE does not transmit a discovery signal in a resource (random muting for receiving signals of other UEs) and another UE transmits a discovery signal in the corresponding resource (almost) simultaneously and selects the same M-bit value as the value selected by the specific UE, a UE which has received discovery signals from the UEs may combine the discovery signals upon wrongly determining that the discovery signals are transmitted from the same UE. To prevent this, different random numbers can be generated for different UE IDs by including some or all UE IDs in seed values of the random sequence generator when an M-bit sequence is selected (in order to select a number depending on UE ID).

Information such as an application ID, UE ID and NDI may be included in a discovery signal by being included in a DMRS CS or piggybacked on a discovery subframe, as described below. Firstly, a specific DMRS CS may be included in DMRS CSs used to indicate transmission of a discovery signal for a new application. In this case, a discovery reception UE performs blind decoding on some DMRS CSs and, when a specific CS or specific CS pattern is obtained (e.g. a CS can be shifted by X whenever a discovery signal is transmitted and initialized to a specific CS value or shifted to +Y (Y being different from X) when the corresponding application is changed), does not combine the corresponding discovery signal with a previously received discovery signal. Alternatively, DMRS base sequences, instead of a DMRS CS, may be changed by a specific sequence. When blind decoding of K DMRS base sequences is previously indicated or signaled to the reception UE by the eNB or another UE, the reception UE may blind-decode the K DMRS base sequences and identify the corresponding application or determine whether to combine the corresponding discovery signal with previously received discovery signals. Secondly, a specific bit string obtained by combining an application ID, NDI and/or UE ID (e.g. using all or part of the information mentioned as inputs of a hashing function) can be piggybacked on a discovery subframe. In this case, the bit string may be mapped from the first RE of a PUSCH (the bitstring is not mapped when a guard interval is used for the first and/or the last SC-FDM symbols of the discovery subframe) and mapped around a DMRS of the discovery subframe. Channel coding different from that applied to discovery signals may be applied to the bit string. Alternatively, the bit string may be channel-coded along with data and transmitted.

A description will be given of a measurement method for determining a range to which current reception quality belongs when a discovery range is divided into N stages in a specific application. This method is useful to discover only users within a predetermined distance in a specific application. While a UE can measure discovery reception quality and determine the measured reception quality as a discovery range, the UE can be aware of only a relative distance difference using quality of received signals. Accordingly, a method for detecting a relationship between reception quality and an actual distance is further required. If the eNB has a DB storing information about actual distances with respect to discovery reception qualities and signals the information to a UE through higher layer signaling, the UE can determine a distance using discovery reception quality. Indication methods through higher layer signaling may include a method of signaling N−1 thresholds to a UE when the discovery range is divided into N stages such that the UE determines a discovery range when discovery reception quality corresponds to a predetermined range. Alternatively, the UE feeds back only discovery reception quality to the eNB and the eNB can determine a discovery range on the basis of the feedback. To generate the DB, the eNB needs to periodically or aperiodically receive a report of position information and information about discovery reception quality from the UE. For example, the eNB can request a UE which has successfully performed discovery to feed back all or part of the ID of the UE, discovery reception quality corresponding to the ID and position information of the UE. Here, feedback request may be performed through a) a periodic request method, b) an aperiodic request method and c) an event-triggered reporting method by which a UE feeds back information only when the UE has successively received a targeted discovery signal. Methods a) and b) may be implemented in such a manner that the eNB sends a request to a specific UE. The request may be sent to the UE through higher layer signaling such as RRC signaling or physical layer signaling. According to method c), a specific UE reports discovery of a target UE when the specific UE discovers the target UE. Here, the eNB can previously transmit the ID of the target UE to UEs participating in discovery through higher layer signaling such as RRC signaling or physical layer signaling. In the aforementioned scheme, the network, which is aware of information about a UE at a confirmed position, can inform UEs participating in discovery of the information (here, informing may mean informing the UEs of information about a signal transmitted from the UE at a confirmed position, and the information about the signal includes all or part of the ID of the UE at a confirmed position, RS information, signal transmission timing and period. Accordingly, a reception UE can estimate the position thereof by measuring a signal from the UE at a confirmed position or report signal measurement information to the network.), receive feedback of information about whether the corresponding UE has been discovered, discovery reception quality when the UE has been discovered and position information of the discovered UE, and generate a DB on the basis of the feedback information. Here, the UE at a confirmed position may be a small UE at a fixed position, previously installed by the network, a UE from which position information is previously fed back or a UE whose position can be correctly recognized through GPS. Alternatively, the UE at a confirmed position may correspond to an eNB which transmits or receives discovery signals like UEs. In the following, a UE whose position is known to the network or a UE at a fixed position is referred to as a "pivot UE" for convenience of description. Since the position of a pivot UE is known to the network, discovery reception quality of a UE which has discovered the pivot UE and position information of a UE which has successfully decoded a discovery signal of the pivot UE are additionally necessary to detect a distance with respect to discovery reception quality. Here, the pivot UE may periodically (or aperiodically) transmit a discovery signal and other UEs may receive the discovery signal and feed back reception quality and position information to the eNB. Alternatively, other UEs may transmit discovery signals and the pivot UE may receive the discovery signals and feed back discovery reception quality of each discovery signal. A UE which has transmitted a discovery signal feeds back only position information thereof to the eNB. According to this scheme, a normal UE can report only position information thereof to the eNB using one of the aforementioned methods, and thus the quantity of feedback information can be reduced. However, the pivot UE needs to simultaneously feed back reception qualities of received discovery signals and IDs. If the pivot UE is an eNB at a fixed position, such as a small cell, or a small UE at a fixed position (which can be called a machine type device or a beacon UE), the pivot UE may be linked to a macro eNB through a backhaul network and thus can share discovery reception quality information and discovery ID with the macro eNB or neighboring eNBs through backhaul.

Consider a case in which an eNB allocates a plurality of discovery resources having different discovery transmission probabilities and all UEs participating in discovery transmit discovery signals in the discovery resources with designated probability. Allocation of discovery resources set to different transmission probabilities is for the purpose of discovering UEs in a wide range in a set with a low transmission probability. Accordingly, if a UE discovered in a region with high a transmission probability is also discovered in a region with a low transmission probability, a discovery range of the UE can be considered to be wide, that is, the UE can be considered to be remotely located, from the viewpoint of discovery reception UE. If a UE is discovered only in a region with a high transmission probability, a discovery range of the UE can be considered to be narrow, that is, the UE can be determined to be located nearby. The eNB may indicate a transmission probability per discovery resource to a UE through higher layer signaling such as RRC signaling and signal information about a distance with respect to discovery reception quality per discovery resource to the UE. To this end, the eNB can receive a report of a measurement value per resource from the UE through one of the aforementioned methods. Otherwise, information about a resource through which a UE has been discovered may be reported to the eNB through physical layer or higher layer signaling. The UE signaled by the eNB may perform discovery signal detection per resource, discriminate a UE commonly discovered in discovery resources from other UEs and determine a discovery range of a companion UE.

The above-described methods are not limited to transmission and reception of discovery signals and may be extended and applied to transmission of normal data other than discovery signals by D2D UEs. In addition, different schemes may be respectively applied to discovery transmission/reception and D2D data transmission/reception or separate parameters in a scheme may be respectively applied thereto. For example, in type 1/mode 2 and type 2/mode 1, transmit power (or transmit control parameter), transmission unit or the number of repeated transmissions per packet may be differently set, and some parameters may be signaled per type/mode through higher layer signaling.

Apparatus Configurations According to an Embodiment of the Present Invention

Figure 11:
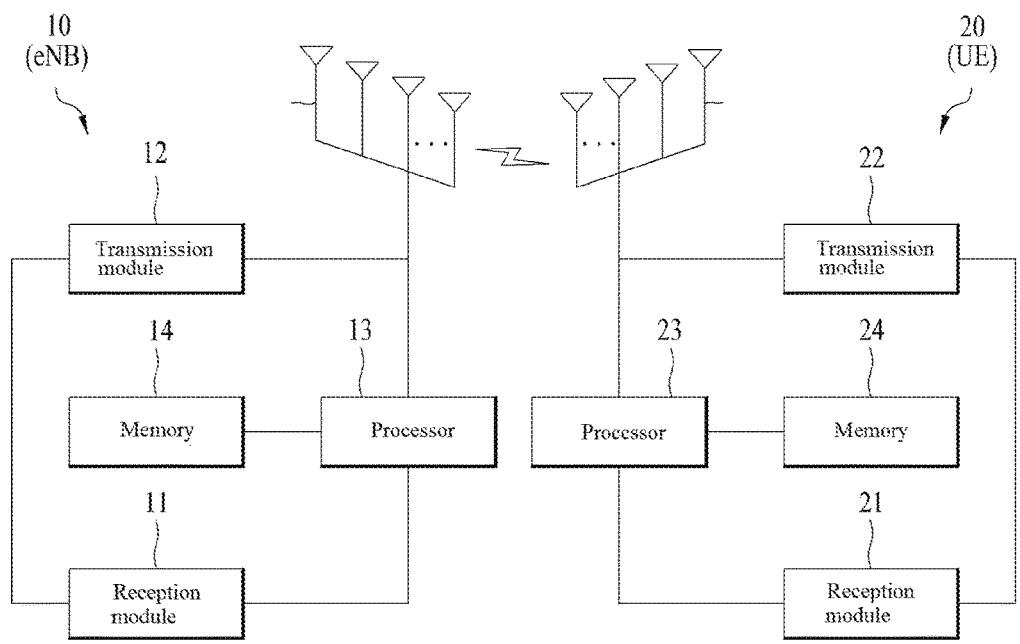
FIG. 11 illustrates configurations of a transmission apparatus and a reception apparatus.

FIG. 11 illustrates configurations of a transmission point apparatus and a UE apparatus according to an embodiment of the present invention.

Referring to FIG. 11, a transmission point apparatus 10 according to an embodiment of the present invention may include a reception module 11, a transmission module 12, a processor 13, a memory 14 and a plurality of antennas 15. The plurality of antennas 15 may indicate that the transmission point apparatus supports MIMO transmission and reception. The reception module 11 may receive signals, data and information on uplink from UEs. The transmission module 12 may transmit signals, data and information on downlink to UEs. The processor 13 may control the overall operation of the transmission point apparatus 10.

The processor 13 of the transmission point apparatus 10 according to the present invention may process operations in the aforementioned embodiments.

In addition, the processor 13 of the transmission point apparatus 10 may process information received by the transmission point apparatus 10 and information transmitted by the transmission point apparatus 10 to the outside. The memory 14 may store the processed information for a predetermined time and may be replaced by a component such as a buffer (not shown).

Referring to FIG. 11, a UE apparatus 20 according to an embodiment of the present invention may include a reception module 21, a transmission module 22, a processor 23, a memory 24 and a plurality of antennas 25. The plurality of antennas 25 may indicate that the UE apparatus supports MIMO transmission and reception. The reception module 21 may receive signals, data and information on downlink from an eNB. The transmission module 22 may transmit signals, data and information on uplink to the eNB. The processor 23 may control the overall operation of the UE apparatus 20.

The processor 23 of the UE apparatus 20 according to the present invention may process operations in the aforementioned embodiments.

In addition, the processor 23 of the UE apparatus 20 may process information received by the UE apparatus 20 and information transmitted by the UE apparatus 20 to the outside. The memory 24 may store the processed information for a predetermined time and may be replaced by a component such as a buffer (not shown).

The configurations of the aforementioned transmission point apparatus and the UE apparatus may be implemented such that the aforementioned various embodiments of the present invention can be independently applied or two or more thereof can be simultaneously applied, and redundant parts are omitted for clarity.

Description of the transmission point apparatus 10 with reference to FIG. 11 may be equally applied to a relay apparatus as a downlink transmission entity or an uplink reception entity, and description of the UE apparatus 20 may be equally applied to a relay apparatus as an uplink transmission entity or a downlink reception entity.

The embodiments of the present invention may be achieved by various means, for example, hardware, firmware, software, or a combination thereof.

In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention is not intended to limit the embodiments disclosed herein but to give a broadest range matching the principles and new features disclosed herein.

INDUSTRIAL APPLICABILITY

The aforementioned embodiments of the present invention are applicable to various mobile communication systems.

What is claimed is:

1. A method for transmitting a device-to-device (D2D) signal by a first user equipment (UE) in a wireless communication system, the method comprising:
   determining whether a D2D signal is to be transmitted on a basis of a transmission probability in a resource region of a resource pool, wherein the transmission probability decreases periodically from a first value to a second value per resource region in the resource pool;
   transmitting the D2D signal in the resource region upon determining that the D2D signal is to be transmitted;
   counting, when a second UE cannot be discovered, a number of times D2D signals are transmitted in a specific subframe; and
   adjusting the first value or the second value based on the number of times D2D signals are transmitted in the specific subframe,
   wherein, when the D2D signal is for requesting to discover the second UE, a codeword of the D2D signal is generated using a part of a service ID and a first UE ID, and
   wherein, when the D2D signal is for responding to a request of the second UE, the codeword of the D2D signal is generated using all of the service ID and the first UE ID.

2. The method according to claim 1, wherein a transmission power parameter used for transmitting the D2D signal is set per discovery type.

3. The method according to claim 2, wherein the discovery type includes type 1 and type 2,
   wherein the type 1 indicates that the first UE selects the resource region of the resource pool and transmits the D2D signal in the selected resource region,
   wherein the type 2 indicates that the first UE transmits the D2D signal in the resource region indicated by an eNB, and
   wherein the transmission power parameter of the type 1 differs from the transmission power parameter of the type 2.

4. The method according to claim 2, wherein the transmission power parameter includes $P_0$ and $\alpha$,
   wherein $P_0$ is a sum of a cell specific power component and a UE specific power component, and
   wherein $\alpha$ is a path loss compensation value.

5. The method according to claim 4, wherein $P_0$ and $\alpha$ are indicated to the first UE through higher layer signaling.

6. The method according to claim 1, wherein the first UE identifies the resource pool through a subframe bitmap.

7. The method according to claim 6, wherein the resource pool is a set of subframes set to 1 in the bitmap, and the transmission probability is indicated through a bitmap corresponding to bits set to 1 in the bitmap.

8. The method according to claim 1, wherein the transmission probability is determined in consideration of one or more of an interference level measurement result and the number of D2D UEs.

9. The method according to claim 1, wherein the transmission probability is equally divided for applications when the first UE transmits the D2D signal per application.

10. The method according to claim 9, wherein a maximum number of transmittable D2D signals is different for each application.

11. A first user equipment (UE) for transmitting a device-to-device (D2D) signal in a wireless communication system, the first UE comprising:
    a transmission module; and
    a processor,
    wherein the processor is configured
    to determine whether a D2D signal is to be transmitted on a basis of a transmission probability in a resource region of a resource pool, wherein the transmission probability decreases periodically from a first value to a second value per resource region in the resource pool,
    to transmit the D2D signal in the resource region upon determining that the D2D signal is to be transmitted,
    to count, when a second UE cannot be discovered, a number of times D2D signals are transmitted in a specific subframe, and to adjust the first value or the second value based on the number of times D2D signals are transmitted in the specific subframe, wherein, when the D2D signal is for requesting to discover the second UE, a codeword of the D2D signal is generated using a part of a service ID and a first UE ID, and wherein, when the D2D signal is for responding to a request of the second UE, the codeword of the D2D signal is generated using all of the service ID and the first UE ID.

* * * * *